US008625837B2

(12) United States Patent
Finocchio et al.

(10) Patent No.: US 8,625,837 B2
(45) Date of Patent: Jan. 7, 2014

(54) PROTOCOL AND FORMAT FOR COMMUNICATING AN IMAGE FROM A CAMERA TO A COMPUTING ENVIRONMENT

(75) Inventors: Mark J. Finocchio, Redmond, WA (US); Jeffrey Margolis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1208 days.

(21) Appl. No.: 12/485,741

(22) Filed: Jun. 16, 2009

(65) Prior Publication Data

US 2010/0304813 A1 Dec. 2, 2010

Related U.S. Application Data

(60) Provisional application No. 61/182,491, filed on May 29, 2009.

(51) Int. Cl.
*G06K 9/00* (2006.01)
*H04N 7/14* (2006.01)

(52) U.S. Cl.
USPC ......... 382/100; 382/190; 348/14.12; 375/240

(58) Field of Classification Search
None
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Manav Seth
(74) *Attorney, Agent, or Firm* — Woodcock Washburn, LLP

(57) ABSTRACT

A media feed interface may be provided that may be used to extract a media frame from a media feed. The media feed interface may access a capture device, a file, and/or a network resource. Upon accessing the capture device, file, and/or network resource, the media feed interface may populate buffers with data and then may create a media feed from the buffers. Upon request, the media feed interface may isolate a media frame within the media feed. For example, the media feed interface analyze media frames in the media feed to determine whether a media frame includes information associated with, for example, the request. If the media frame includes the requested information, the media feed interface may isolate the media frame associated with the information and may provide access to the isolated media frame.

18 Claims, 8 Drawing Sheets

(56) References Cited

U.S. PATENT DOCUMENTS

| | | | |
|---|---|---|---|
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,673,205 A * | 9/1997 | Brunson | 725/114 |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,029,194 A * | 2/2000 | Tilt | 725/94 |
| 6,054,991 A | 4/2000 | Crane et al. | |
| 6,057,909 A | 5/2000 | Yahav et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,517 A | 8/2000 | Yahav et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,253,238 B1 * | 6/2001 | Lauder et al. | 709/217 |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,498,628 B2 | 12/2002 | Iwamura | |
| 6,502,105 B1 * | 12/2002 | Yan et al. | 1/1 |
| 6,502,515 B2 | 1/2003 | Burckhardt et al. | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,771,277 B2 | 8/2004 | Ohba | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,006,236 B2 | 2/2006 | Tomasi et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,177 B2 | 5/2006 | Tomasi et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,151,530 B2 | 12/2006 | Roeber et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,224,384 B1 | 5/2007 | Iddan et al. | |
| 7,224,830 B2 | 5/2007 | Nefian et al. | |
| 7,227,526 B2 | 6/2007 | Hildreth et al. | |
| 7,259,747 B2 | 8/2007 | Bell | |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,376,274 B2 * | 5/2008 | Xiong | 382/218 |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,148 B1 * | 12/2008 | Clark et al. | 348/143 |
| 7,460,690 B2 | 12/2008 | Cohen et al. | |
| 7,489,812 B2 | 2/2009 | Fox et al. | |
| 7,536,032 B2 | 5/2009 | Bell | |

(56) References Cited

U.S. PATENT DOCUMENTS

| | | | |
|---|---|---|---|
| 7,546,554 B2* | 6/2009 | Chiu et al. ............... | 715/864 |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,590,329 B2* | 9/2009 | Shinkai et al. ............... | 386/278 |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,773,809 B2* | 8/2010 | Lee et al. ............... | 382/190 |
| 7,792,998 B2* | 9/2010 | Heo et al. ............... | 709/246 |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,999,842 B1* | 8/2011 | Barrus et al. ............... | 348/37 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,086,587 B2* | 12/2011 | Obana et al. ............... | 707/705 |
| 8,312,486 B1* | 11/2012 | Briggs et al. ............... | 725/32 |
| 8,358,377 B2* | 1/2013 | Ahn et al. ............... | 348/564 |
| 8,397,258 B2* | 3/2013 | Kim et al. ............... | 725/41 |
| 2003/0002853 A1* | 1/2003 | Hori et al. ............... | 386/65 |
| 2003/0086692 A1* | 5/2003 | Hori et al. ............... | 386/69 |
| 2003/0098869 A1* | 5/2003 | Arnold et al. ............... | 345/589 |
| 2003/0196211 A1* | 10/2003 | Chan ............... | 725/131 |
| 2004/0207597 A1 | 10/2004 | Marks | |
| 2004/0239670 A1 | 12/2004 | Marks | |
| 2005/0059488 A1 | 3/2005 | Larsen et al. | |
| 2005/0210145 A1* | 9/2005 | Kim et al. ............... | 709/231 |
| 2005/0229118 A1* | 10/2005 | Chiu et al. ............... | 715/864 |
| 2006/0048191 A1* | 3/2006 | Xiong ............... | 725/52 |
| 2006/0188144 A1 | 8/2006 | Sasaki et al. | |
| 2006/0221250 A1 | 10/2006 | Rossbach et al. | |
| 2006/0239558 A1 | 10/2006 | Rafii et al. | |
| 2007/0013718 A1 | 1/2007 | Ohba | |
| 2007/0022215 A1* | 1/2007 | Singer et al. ............... | 709/246 |
| 2007/0060336 A1 | 3/2007 | Marks et al. | |
| 2007/0098222 A1 | 5/2007 | Porter et al. | |
| 2007/0103543 A1 | 5/2007 | Anderson et al. | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0026838 A1 | 1/2008 | Dunstan et al. | |
| 2008/0062257 A1 | 3/2008 | Corson | |
| 2008/0100620 A1 | 5/2008 | Nagai et al. | |
| 2008/0126937 A1 | 5/2008 | Pachet | |
| 2008/0134102 A1 | 6/2008 | Movold et al. | |
| 2008/0170776 A1 | 7/2008 | Albertson et al. | |
| 2008/0215972 A1 | 9/2008 | Zalewski et al. | |
| 2008/0215973 A1 | 9/2008 | Zalewski et al. | |
| 2009/0167679 A1 | 7/2009 | Klier et al. | |
| 2013/0061262 A1* | 3/2013 | Briggs et al. ............... | 725/32 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

(56) References Cited

OTHER PUBLICATIONS

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

Patch, "Light Show Makes 3D Camera", Technology Research News, May 5-7, 2003, 1-4.

ThingLab, "3DV Systems-Zmini-Discontinued", www.thinglab.co.uk-scanning_product.php?URL_=product_digiscan_3dvsystems_zmini&SubCatID_=53, accessed Dec. 11, 2008, 1-4.

Yahav et al., "3D Imaging Camera for Gaming Application", International Conference on Consumer Electronics, ICCE 2007, Digest of Technical Papers, Las Vegas, NV, Jan. 10-14, 2007, 1-2.

Zeiss, "AxioCam MRc5 Digital Camera", Carl Zeiss MicroImaging Inc., For High-Resolution Color Photos of Microscopic Specimens, Jan. 28, 2005, 1-5.

* cited by examiner

PROTOCOL AND FORMAT FOR COMMUNICATING AN IMAGE FROM A CAMERA TO A COMPUTING ENVIRONMENT

CROSS-REFERENCE TO RELATED APPLICATIONS

This application claims the benefit under 35 U.S.C. §119 (e) of U.S. Provisional Patent Application No. 61/182,491 filed May 29, 2009, the disclosure of which is incorporated herein by reference.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for providing a media feed interface that may be used to extract a media frame from a media feed. For example, a capture device, a file, and/or a network resource may be accessed by the media feed interface. Upon accessing the capture device, file, and/or network resource, the media feed interface may receive a media feed. When the media feed interface receives a request to retrieve a media frame from, for example, an application, the media feed interface may isolate a media frame within the media feed. In one embodiment, the media frame interface may receive a request to retrieve a media frame that may include data associated with a model such as a skeletal model, a mesh human model, or the like that may be associated with a human target. The media feed interface may analyze one or more media frames to determine whether the media frame includes data associated with the model. The media feed interface may then isolate one or more media frames that include the data associated with the model. The data associated with the model may then be provided to the application such that the application may process the data associated with the one or more isolated media frames.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

Figure 1A:
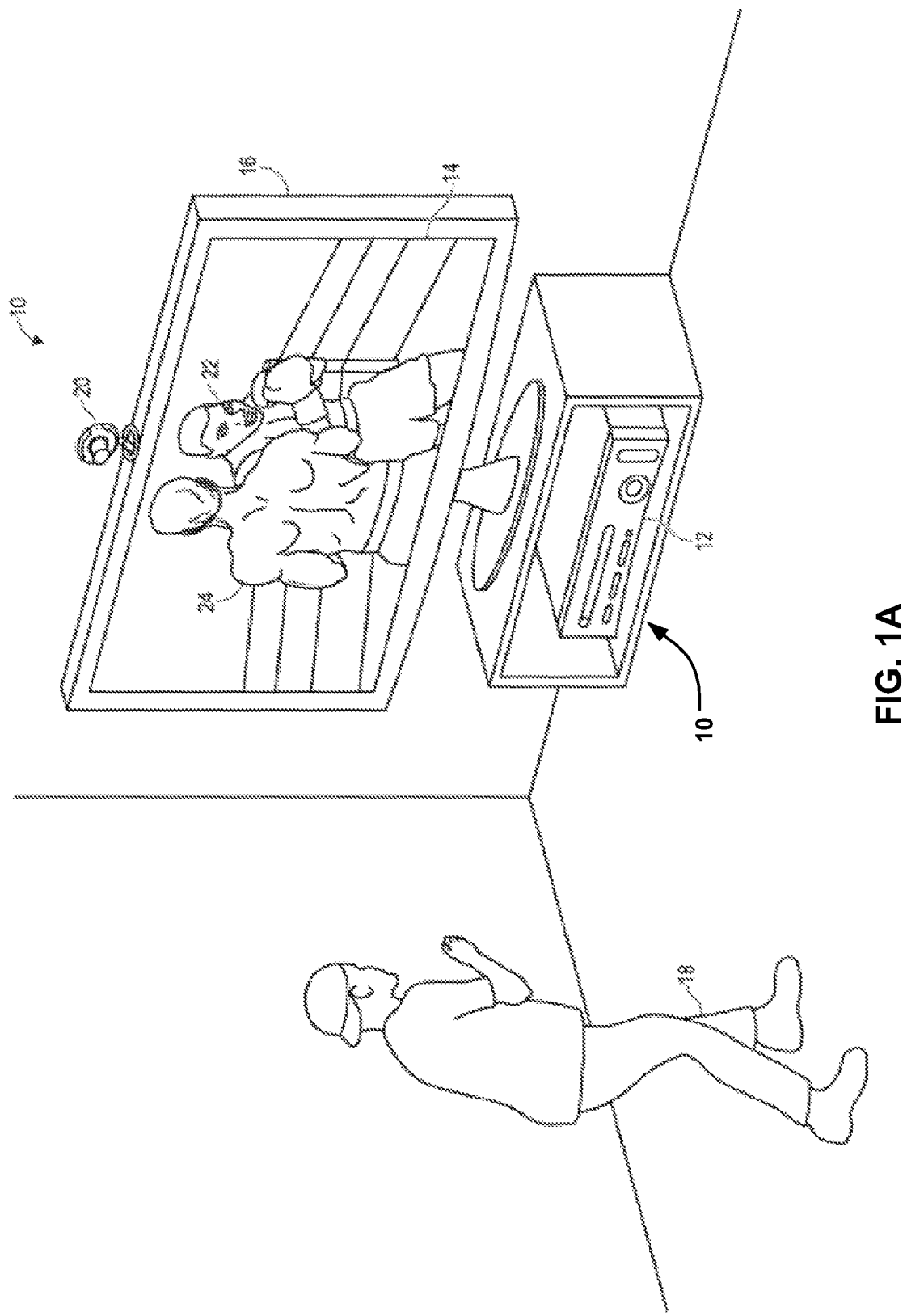
FIGS. 1A and 1B illustrate an example embodiment of a target recognition, analysis, and tracking system with a user playing a game.
Figure 1B:
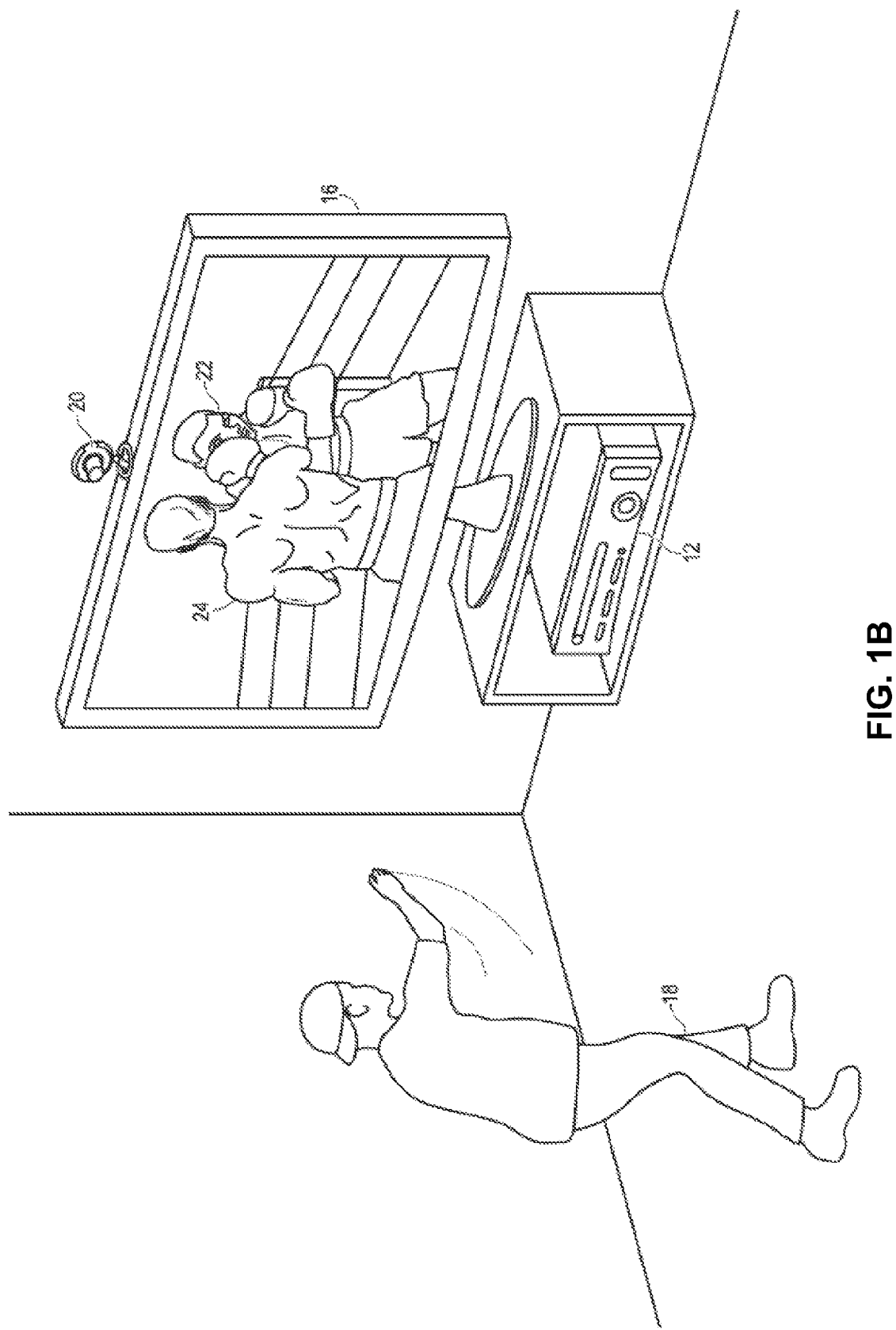

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for accessing a capture device, receiving depth images from the captured device, creating a media feed associated with information of the depth images, analyzing the media feed to determine whether one or more media frames includes information such as information or data corresponding to a model associated with, for example, a human target in the depth images, isolating a media frame within the media feed that includes the information, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computing environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computing environment 12 and the capture device 20 of the target recognition, analysis, and tracking system 10 may be used to recognize and analyze the punch of the user 18 in physical space such that the punch may be interpreted as a game control of the player avatar 40 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
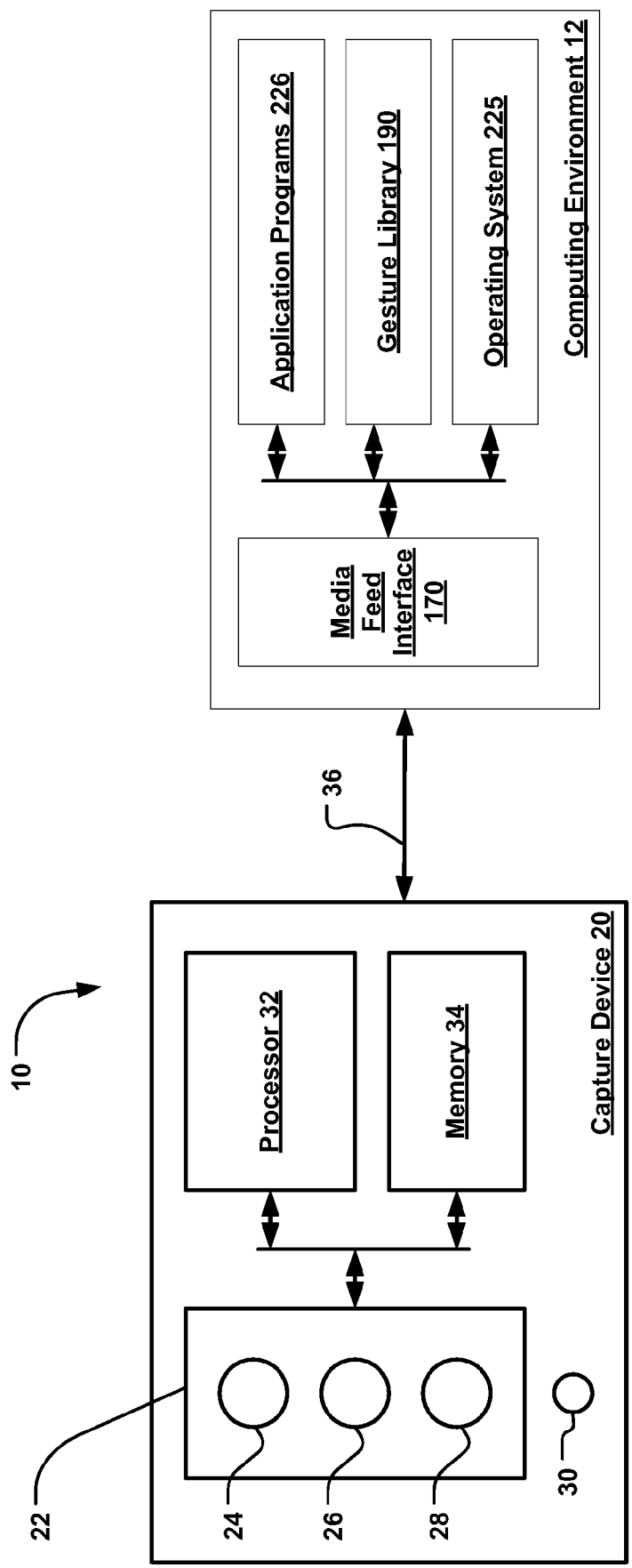
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for accessing a capture device, receiving depth images from the captured device, creating a media feed associated with information of the depth images, analyzing the media feed to determine whether one or more media frames includes information such as information or data corresponding to a model associated with, for example, a human target in the depth images, isolating a media frame within the media feed that includes the information, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide and/or capture data such as depth images, RGB images, IR images, and/or any other information or data captured by, for example, the 3-D camera 26, and/or the RGB camera 28 to the computing environment 12. Additionally, the capture device 20 may provide, for example, a model such as a skeletal model, a mesh model, or the like that may be generated by the capture device 20 to the computing environment 12. In an example embodiment, the capture device 20 may create a media feed within the capture device 20 using the captured data and/or the model. For example, the capture device 20 may populate buffers with the captured data and/or the model and may then create a media feed from the buffers.

According to an example embodiment, the capture device 20 may provide the captured data, the generated model, and/or the media feed to the computing environment 12 via the communication link 36. For example, as shown in FIG. 2, the computing environment 12 may include the media frame interface 170. The media frame interface 170 may provide communication between, for example, the capture device 20 and components of the computing environment 12 such as application programs 226, a gesture library 190, and an operating system 225 that may be executed by the computing environment 12. The capture device 20 may provide a media feed that may be created thereby to the media feed interface 170 using communication link 36.

According to another embodiment, the media feed interface 170 may access the capture device 20 to retrieve the captured data and/or model and create a media frame. For example, as described above, the capture device 20 may provide captured data and/or a model to the media feed interface 170 via the communication link 36. The media feed interface 170 may populate buffers with the captured data and/or model received from the capture device and may create a media feed from the buffers.

The media frame interface 170 may provide data such as a media frame associated with the media feed to, for example, the applications programs 226, the gesture library 190, and/or the operating system 225. For example, the media feed interface 170 may receive a request from, for example, one of the application programs 226, the gesture library 190, and/or the operating system 225. When the media feed interface 170 receives the request, the media feed interface 170 may receive the media feed and may isolate a media frame within the media feed. As described above, the media feed interface 170 may then analyze the media frame, determine whether the media frame includes a model of a human target, or the like, which will be described in more detail below. Additionally, the media feed interface 170 may retrieve a model associated with the media frame from the media feed.

In one embodiment, the application programs 226, the gesture library 190, and/or the operating system 225 may use the isolated media frame to, for example, control an application such as a game or word processor. For example, as shown, in FIG. 2, the computing environment 12 may include the gesture library 190. The gesture library 190 may include a collection of gesture filters, each comprising information concerning a gesture that may be performed by the model (as the user moves). The media feed including each of the media frames may include data captured and/or generated by the camera 26, the RGB camera 28, and the capture device 20 including the model and movements associated with the model. According to an example embodiment, the model in the media feed may be compared to the gesture filters in the gesture library 190 to identify when a user (as represented by the model) has performed one or more gestures. Those gestures may be associated with various controls of an application. Thus, the computing environment 12 may use the gesture library 190 to interpret movements of the model and to control an application based on the movements based on a media feed that includes data captured and/or generated by, for example, the capture device 20.

Figure 3:
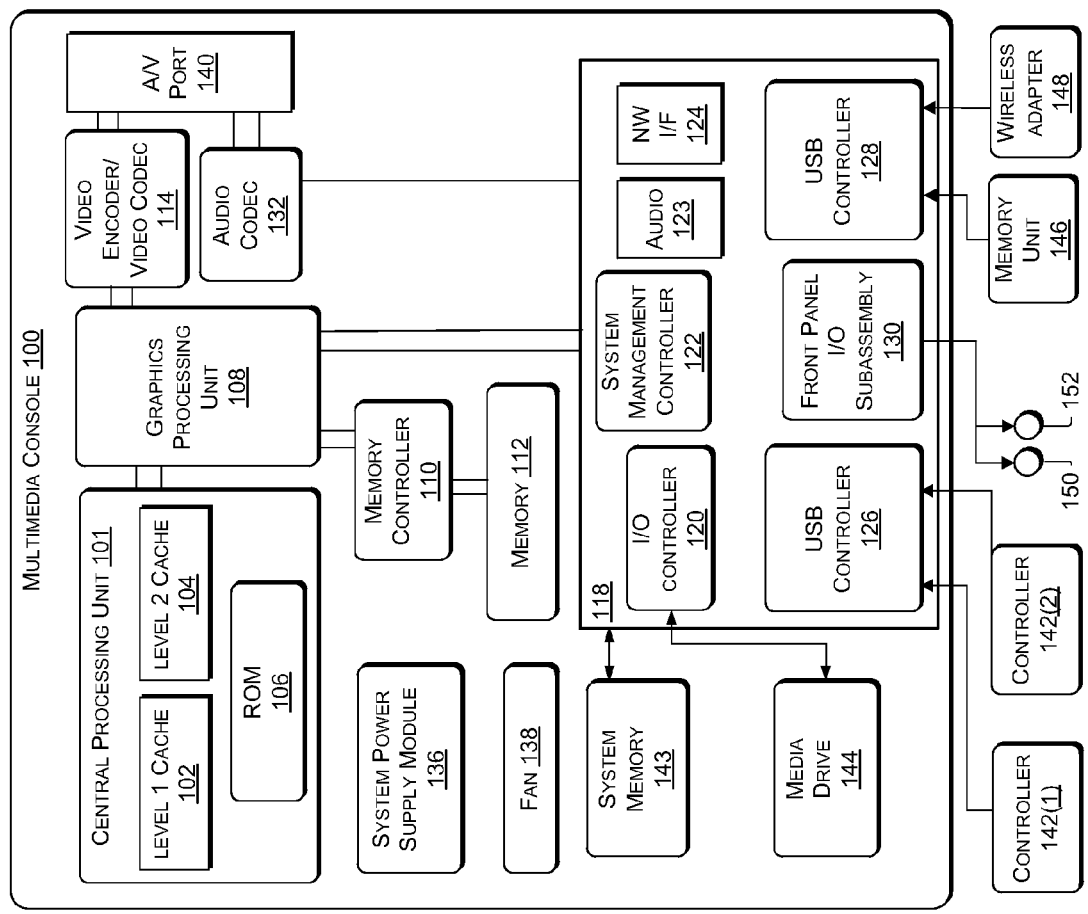
FIG. 3 illustrates an example embodiment of a computing environment that may be used to interpret one or more gestures in a target recognition, analysis, and tracking system.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media included within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to include the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The camera 26, the RGB camera 28, and capture device 20 may define additional input devices for the multimedia console 100.

Figure 4:
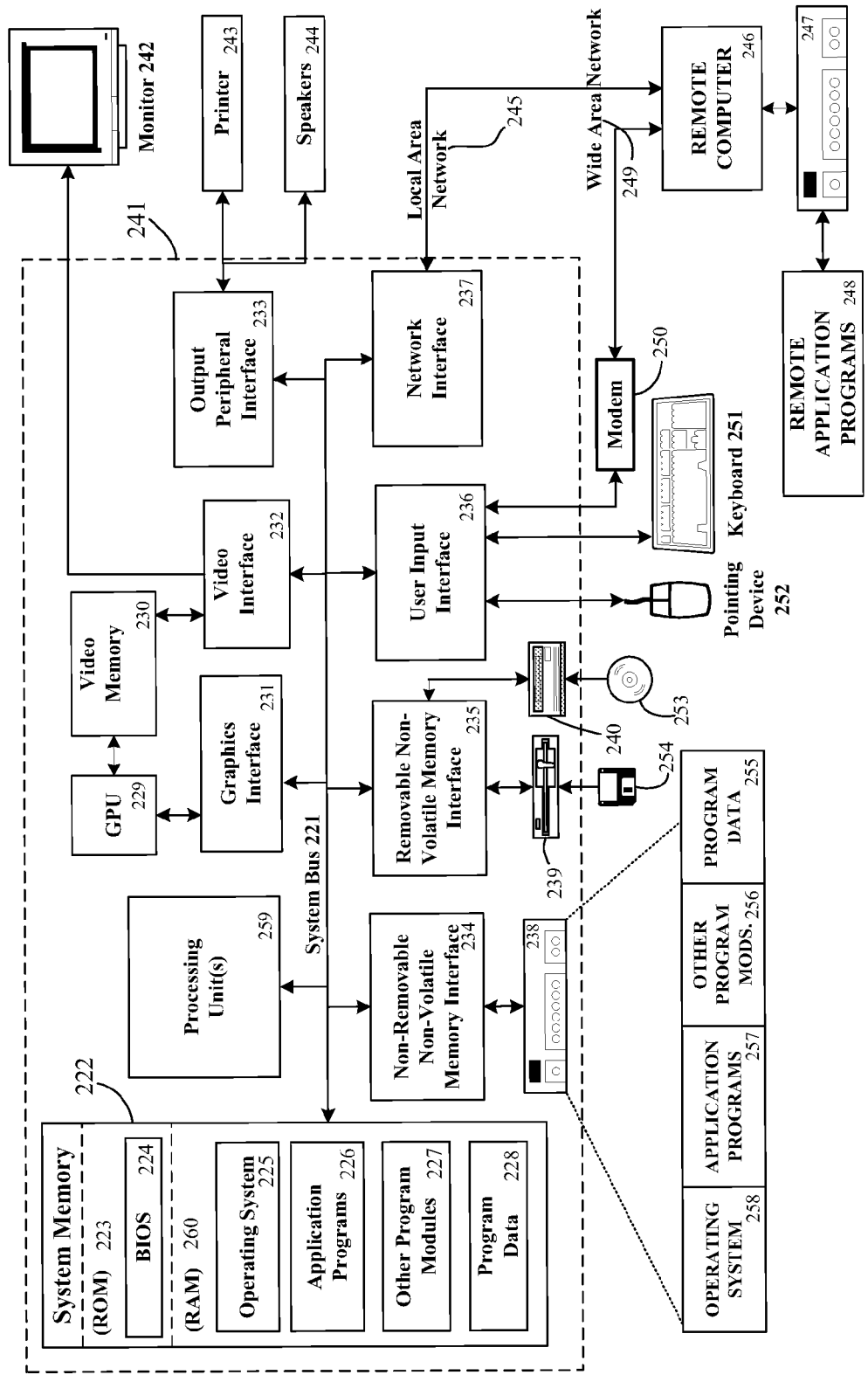
FIG. 4 illustrates another example embodiment of a computing environment that may be used to interpret one or more gestures in a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system. The computing environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary computing environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), including the basic routines that help to transfer information between elements within computer 241, such as during start-up, is typically stored in ROM 223. RAM 260 typically includes data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The camera 26, the RGB camera 28, and capture device 20 may define additional input devices for the multimedia console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory storage device 247. It will be appreciated that the network connections shown are exemplary and other means of establishing a communications link between the computers may be used.

Figure 5:
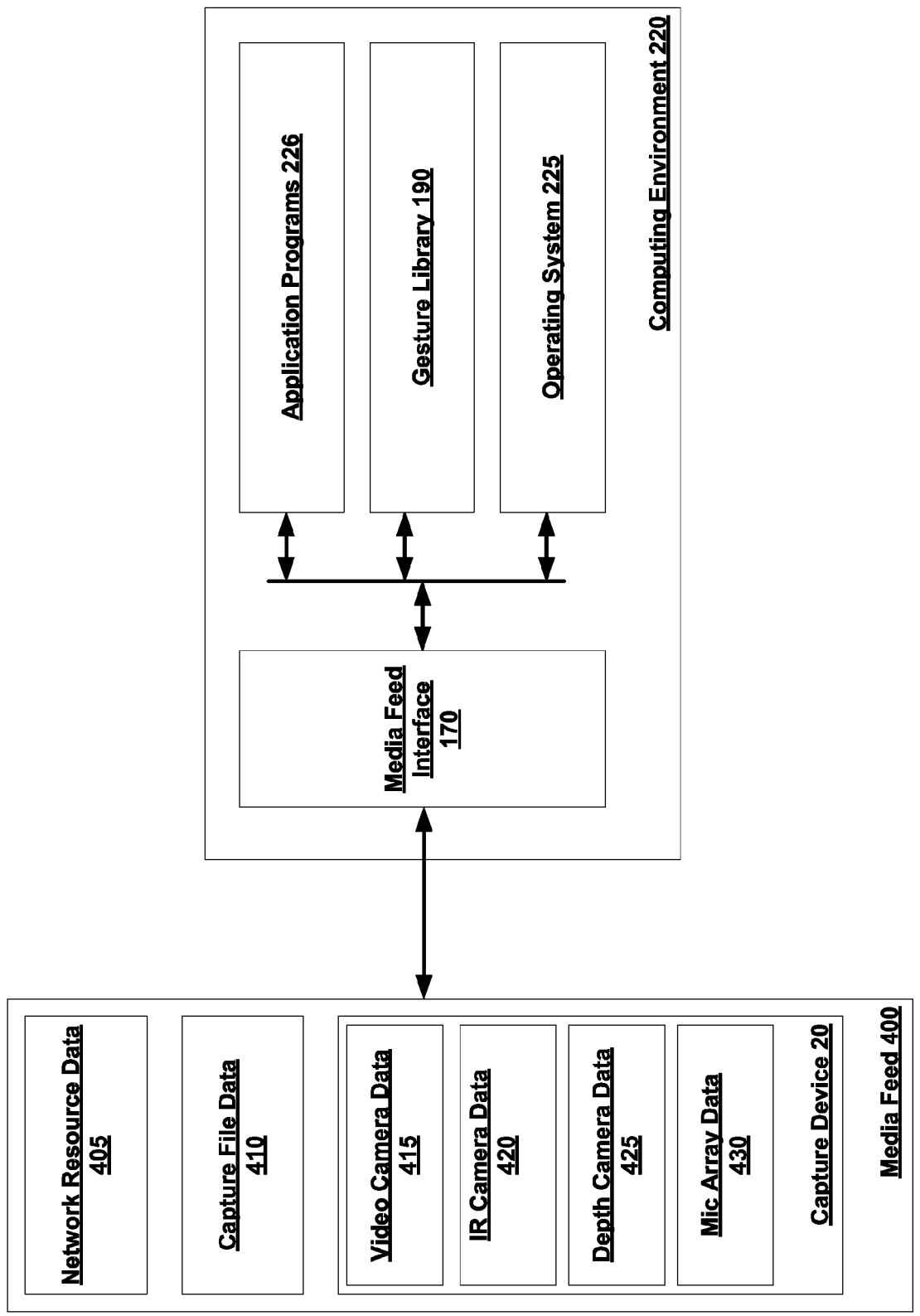
FIG. 5 illustrates an example embodiment of a media feed interface that may be used to extract a media frame from a media feed to provide, for example, data that may be captured and/or generated by a capture device.

FIG. 5 illustrates an example embodiment of a media feed interface 170 that may be used to extract a media frame from a media feed to provide, for example, data that may be captured and/or generated by a capture device such as the capture device 20 described above with respect to FIGS. 1A-2, a file, or a network resource. In an example embodiment the media feed interface 170 may be a middleware application such as an application programming interface (API) that may provide communication between, for example, the operating system 225, the application programs 226, the gesture library 190 and/or the capture device 20. For example, the media feed interface 170 may act as an intermediary between the operating system 225, the application programs 226, the gesture library 190, and/or the capture device 20 such that the media feed interface 170 may understand commands, function calls, data, or the like from, and may provide commands, function calls, data, or the like to the operating system 225, the application programs 226, the gesture library 190, and the capture device 20.

In one embodiment, the media feed interface 170 may be integrated into the application programs 226 such that the application programs 226 may execute the media feed interface 170. Alternatively, the media feed interface 170 may be integrated into either the gesture library 190, or the operating system 225, or the media feed interface 170 may be an independent application executing on the computing environment 12.

As further shown in FIG. 5, the media feed interface 170 may receive and/or access data that may be included in a media feed 400 from a plurality of sources such as the capture device 20 described above with respect to FIG. 1A-2, a capture file, and/or a network resource. For example, in one embodiment, the media feed interface 170 may access the capture device 20 to retrieve, for example, video camera data 415, IR camera data 420, depth camera data 425, mic array data 430, or any other data that may be captured by the capture device 20. Additionally, the media feed 400 may include data associated with a model that be generated for a user by, for example, the capture device 20 Upon retrieving the data in the media feed 400, the media interface 170 may create the media feed 400, may isolate a media frame within the media feed 400, and/or may provide data from the media feed 400 to an end user application such as the applications programs 226, the gesture library 190, and/or the operating system 225.

In one embodiment, upon retrieving the data, the media interface 170 may populate one or more buffers with the captured data. In populating the buffers with the captured data, the media feed interface 170 may packetize, time stamp, and interleave the captured data such that the media feed interface 170 may packetize, time stamp, and interleave the data in the media feed 400 along a timeline to create media frames that enable a synchronized playback experience. For example, the media feed interface 170, at the request of the application programs 226, may retrieve a media frame that includes an RGB image that corresponds to a specific time based on the packetized, time stamped, and interleaved captured data in the media feed 400 created by the media feed interface 170.

In another embodiment, the media feed interface 170 may access a capture file to retrieve capture file data 410 that may be included in the media feed 400. The capture file data 410 may include stored data that may have been previously captured by the capture device 20. For example, the capture device 20 may create a capture file that may include the capture file data 410 that may have been previously by the captured device 20.

In yet another embodiment, the media feed interface 170 may access a network resource to retrieve network resource data 405 that may be included in the media feed 400. The network resource data 405 may include data associated with a model of the user, depth images, RGB images, sound, infrared data, or the like that may be included. According to example embodiments, the network resource data 405 may include capture file data and/or data captured by a capture device that may be accessible through a network such as a home network, the Internet, an intranet, WAN, LAN, or the like. For example, data captured by a capture device such as the capture device 20 located at a remote location may be accessed as a network resource such that data captured by the remote captured device may be received by the media feed interface 170 in the network resource data 410.

After retrieving the capture file data 410 and/or the network resource data 405, the media feed interface 170 may use the data to populate buffers as described above such that the media feed interface 170 may packetize, time stamp, and interleave the data in the media feed 400 along a timeline to create media frames that enable a synchronized playback experience.

Figure 6:
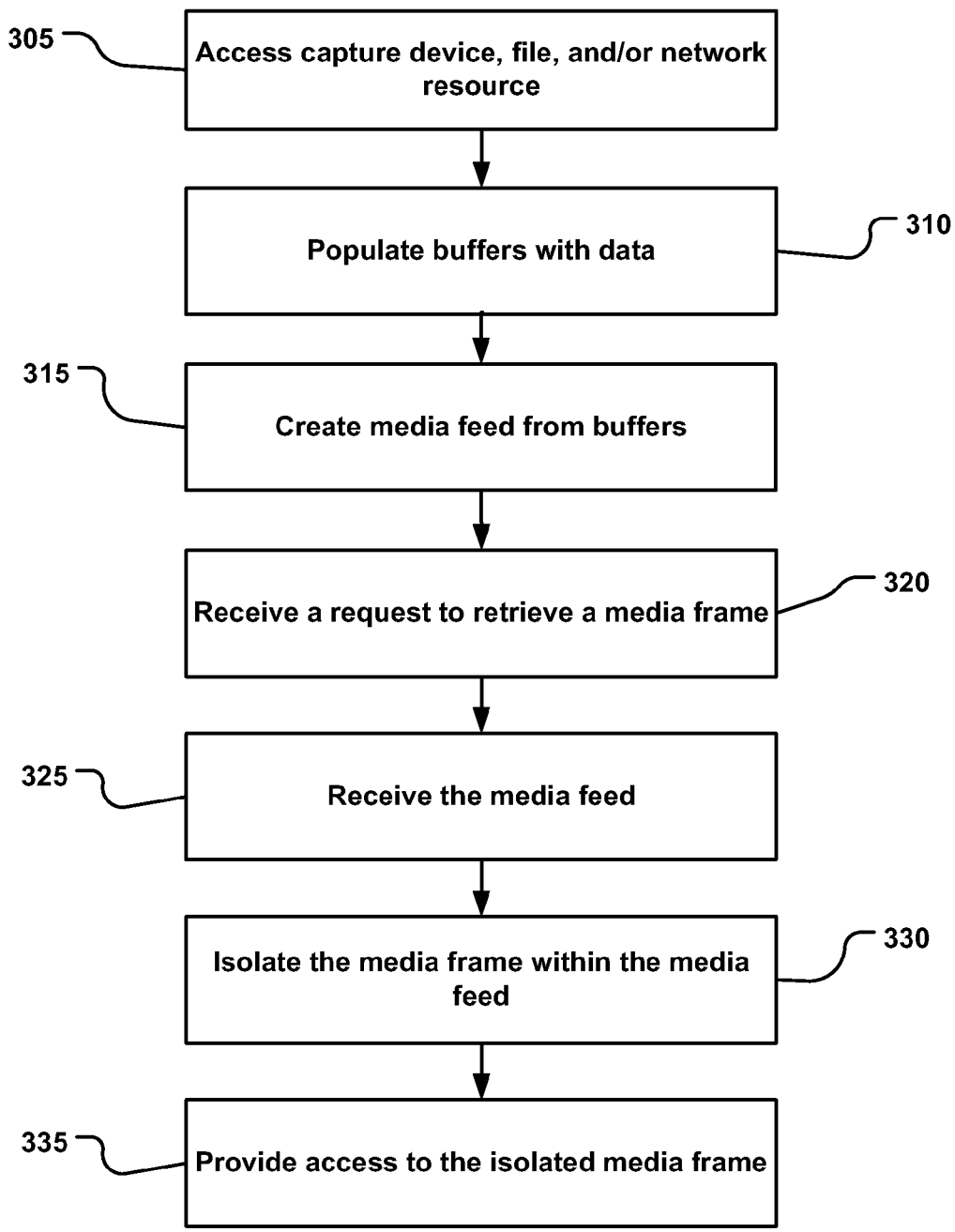
FIG. 6 depicts a flow diagram of an example method 300 for extracting information or data in a media feed.

FIG. 6 depicts a flow diagram of an example method 300 for extracting information or data in a media feed. The example method 300 may be implemented using, for example, the media feed interface 170 described above with respect to FIG. 5. In an example embodiment, the example method 300 may take the form of program code (i.e., instructions) that may be executed by, for example, the capture device and/or the computing environment of the target recognition, analysis, and tracking system described with respect to FIGS. 1A-5.

At 305, a capture device, a file, and/or a network resource may be accessed. For example, a media feed interface such as the media feed interface 170 described above with respect to FIG. 5 may access a capture device, such as the capture device 20, a capture file, and/or a network resource. In accessing the capture device, the capture file, and/or the network resource, the media feed interface may be responding to a request issued by application programs such as the application programs 226, a gesture library such as the gesture library 190, a operating system such as the operating system 225, and/or a computing environment such as the computing environment 12 described above with respect to FIGS. 1A-5.

In one embodiment, the media feed interface may access the capture device at 305 to retrieve captured depth information, depth images, sound, infrared data, data associated with a model, or any other data capable of being provided by the capture device. Additionally, the media feed interface may also access the capture file and/or network resource to retrieve captured depth information, depth images, sound, infrared data, data associated with a model of the user, or the like.

Figure 7:
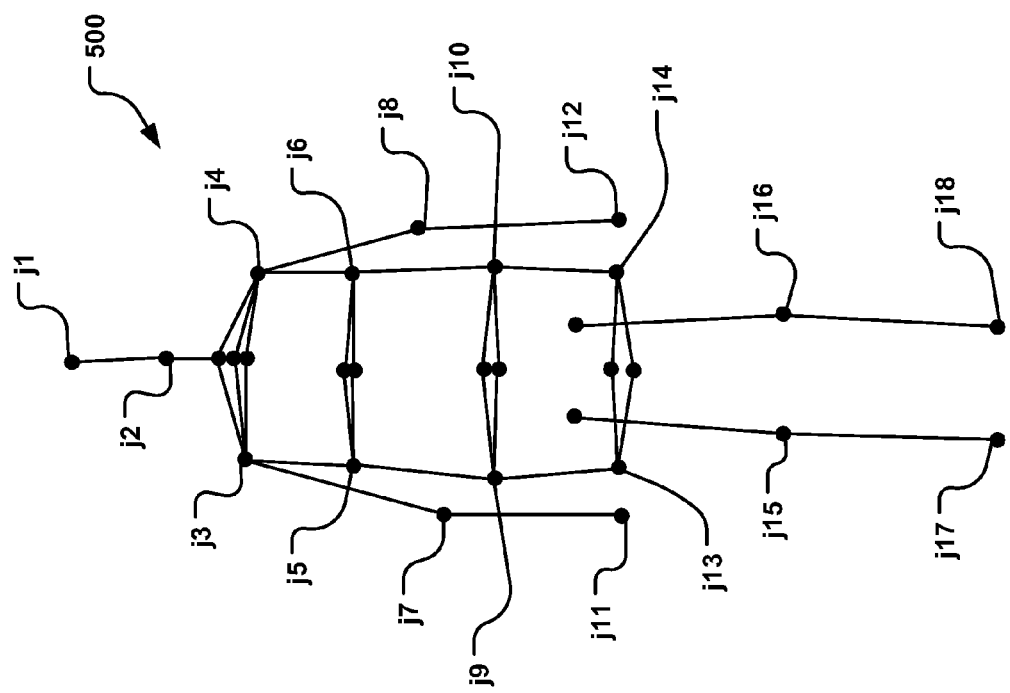
FIG. 7 illustrates an example embodiment of a model of a user.

FIG. 7 illustrates an example embodiment of a model 500 of a user such as the user 18 described above with respect to FIGS. 1A and 1B that may be included in the data that may received from the capture device, the file, and/or the network resource at 305. According to an example embodiment, the model 500 may include one or more data structures that may represent, for example, the user captured in, for example, a depth image. For example, each body part of the user may be characterized as data or a mathematical vector or data that may define joints and bones of the model 500 that may be included in the one or more data structures.

As shown in FIG. 7, the model 500 may include one or more joints j1-j18. According to an example embodiment, each of the joints j1-j18 may have data including a respective X value, Y value, and Z value associated therewith that may be stored in the one or more data structures. Additionally, each of the joints j1-j18 may define one or more body parts therebetween that may move relative to one or more other body parts. For example, a model of the user may include a plurality of rigid and/or deformable body parts that may be defined by one or more structural members such as "bones" with the joints j1-j18 located at the intersection of adjacent bones. The joints j1-j18 may enable various body parts associated with the bones and joints j1-j18 to move independently of each other. As described above, each of the joints j1-j18 and the bones defined therebetween may be defined as data or a mathematical vector in the one or more data structures associated with the model 500.

Referring back to FIG. 6, at 310, buffers may be populated with data received from the capture device, the capture file, and/or the network resource. For example, the media feed interface may populate buffers with data received from the capture device, the capture file, and/or the network resource. A buffer may be a region of memory that is used to temporarily and/or permanently stored data. The buffer may be implemented in either hardware or software, and may include random access memory (RAM), read only memory (ROM), cache, Flash memory, a hard disk, or any other suitable storage component.

In one embodiment, the media feed interface may provide the application programs, the gesture library, the operating system, and/or the computing environment with direct access to the buffers. For example, upon receiving a request from the application programs, the media feed interface may supply the application programs with the memory address of the buffer that includes data populated from the capture device. In another embodiment, the media feed interface may provide the application programs, the gesture library, the operating system, and/or the computing environment with indirect access to the buffers. For example, upon receiving a request from the application programs, the media feed interface may retrieve data included within the populated buffer. Upon retrieving the data included within the buffer, the media feed interface may provide the data to the application programs without revealing the memory address of the buffer.

In another embodiment, the media feed interface may also save the populated buffers to a capture file and/or a network resource. In saving a buffer, the media feed interface may save the data within the buffer to an existing capture file and/or network resource, or may create a new capture file and/or network resource. Additionally, the media feed interface may have the capability to save the buffer in response to a request from the application programs, the gesture library, the operating system, and the computing environment.

At 315, a media feed such as the media feed 400 described above may be created. For example, the media feed interface may create a media feed at 315 using the buffers that may have been populated with data from the capture device, the capture file, and/or the network resource at 310. In creating the media feed, the media feed interface may packetize, time stamp, and interleave data from capture device, the capture file, and/or the network resource along a timeline to create media frames that enable a synchronized playback experience as described above.

In one embodiment, the media feed interface may filter the data that may be used to create the media feed at 315 such that media feed may include filtered data taken from the capture device, the capture file, and/or the network resource. For example, the media feed interface may receive IR, RGB, and depth image data from the capture device; however, the media feed interface may filter the IR and depth image data such that only the RGB data may be included in the media feed. According to an example embodiment, the data may be filtered at the request of the application programs, the gesture library, the operating system, and/or the computing environment.

In another embodiment, the media feed interface may enable the application programs, the gesture library, the operating system, and the computing environment to select the appropriate filters that may be applied to the data before media frames are created at 315 and included in the media feed such that unneeded media frames may not be included in the created media feed.

At 320, a request to retrieve data captured by the capture device, data associated with a model, network resource data, capture file data, or the like that may be included in the media feed may be received. For example, the media feed interface may receive a request to data retrieve captured by the capture device, data associated with a model, network resource data, capture file data, or the like that may be included in the media feed. In example embodiments, the request may be from application programs such as the applications programs 226, a gesture library such as the gestures library 190, an operating system such as the operating system 225, and/or a computing environment such as the computing environment 12 described above with respect to FIGS. 1A-5.

At 325, the created media feed may be received and/or accessed. For example, the media feed interface may receive and/or access the media feed created at, for example, 320. According to an example embodiment, the created media feed may be received and/or accessed by the media feed interface in response to the request received at 320. For example, application programs may request access to data such as data associated with a model such as the model 500 described above with respect to FIG. 7 of the user that may be included in the media feed. The media feed interface may receive such request and upon receiving the request, the media feed interface may retrieve and/or access the media feed.

At 330, a media frame associated with the media feed may be isolated. For example, as described above, the media feed interface may create the media feed at 315 such that the media feed may include on or more media frames that may include various data received from the capture device, the capture file, and/or the network resource. In one embodiment, the media feed interface may isolate a media frame with the media feed in response to a request for specific data in the media feed made by, for example, the application programs, the gesture library, the operating system, and/or the computing environment at 320. In isolating the media frame, the media feed interface may isolate a specific media frame, a range of frames, or the like that may be associated with the requested data. According to an example embodiment, one or more media frame may included media frames associated with RGB images, IR data, sound data, depth data, 3-D data, data associated with a model of the user and/or any other data at a specific point in time, over a time range, or the like.

At 335, access may be provided to the isolated media frame. For example, in one embodiment, after isolating the media frame, the media feed interface may provide the application programs, the gesture library, the operating system, and/or the computing environment access to the data in the isolated media frame. Additionally, according to another embodiment, the media feed interface may automatically isolate the media frame and may provide access to the isolated media frame without receive a specific request from the application programs, the gesture library, the operating system, and/or the computing environment.

In one embodiment, the application programs, the operating system, the gesture library, and/or the computing environment process the isolated media frame provided by the media feed interface. For example, the application programs, the operating system, the gesture library, and/or the computing environment may use the data in the isolated media frame to track the model of the user, render an avatar associated with the model, determine clothing, skin and other colors based on a corresponding RGB image, and/or determine which controls to perform in an application executing on the computer environment based on, for example, the model.

In another embodiment, the visual appearance of an on-screen character may then be changed in response to data accessed in the isolated media frame. For example, a user such as the user described above with respect to FIGS. 1A and 1B playing an electronic game on a gaming console may be tracked by the gaming console as described herein. In particular, a model such as a skeletal model may be used to represent a game player. As the game player straightens one arm, the computer environment may track this motion by accessing the data associated with the model such as the model 500 of the target game player in media frames of the media feed. The computing environment may then adjust a body model of a player avatar associated with the user using the data associated with the model of the user accessed in the media frame of the media feed.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A computer-implemented method for extracting captured information, the computer-implemented method comprising:
    receiving a request to retrieve, from a media feed, data associated with a model of a user;
    accessing the media feed; and
    isolating a media frame from the media feed, wherein the media frame includes the data associated with the model of the user, wherein isolating the media frame from the media feed comprises:
        determining that the media frame includes the data associated with the model of the user; and
        extracting the media frame that includes the data associated with the model of the user.

2. The computer-implemented method of claim 1, wherein isolating the media frame occurs at the request of at least one of the following: an application, an operating system, and a gesture library.

3. The computer-implemented method of claim 2 further comprising providing the media frame to at least one of the following: the application, the operating system, and the gesture library.

4. The computer-implemented method of claim 1, wherein the request comprises a time stamp, and wherein isolating the media frame from the media feed further comprises:
    determining the media frame from the media feed that corresponds to the specified time stamp in the request; and
    extracting the media frame that corresponds to the specified time stamp in the request.

5. The computer-implemented method of claim 1, wherein the request comprises a filter type, and wherein isolating the media frame from the media feed further comprises:
    filtering data from the media frame based on the filter type in the request; and
    creating a new media feed, the new media feed including the filtered data from the media frame.

6. The computer-implemented method of claim 1, wherein receiving the media feed comprises:
    accessing at least one of a capture device, a capture file, and a network resource;
    receiving data from at least one of the capture device, the capture file, and the network resource;
    populating one or more buffers with the received data; and
    creating the media feed with the received data in the buffers, wherein the media feed includes one or more media frames for the received data in the buffers.

7. A computer-readable storage medium that is not a signal and that has stored thereon computer executable instructions for extracting captured information, the computer executable instructions comprising instructions for:
    transmitting a request to a media feed interface, the request specifying data associated with a model of a user to be retrieved from a media feed, the media feed comprising at least one media frame that includes data;
    accessing a media frame associated with the request, wherein the accessed media frame includes joint data associated with the model of the user; and
    processing the accessed media frame.

8. The computer-readable storage medium of claim 7, wherein the request includes a time stamp associated with the accessed media frame.

9. The computer-readable storage medium of claim 8, wherein the request specifies at least one of the following type of data associated with the accessed media frame: a depth image, an image, an RGB image, an IR image, sound data, infrared data, video data and picture data.

10. The computer-readable storage medium of claim 9, wherein the media frame accessed from the media feed interface is associated with the type of data and the time stamp in the request.

11. The computer-readable storage medium of claim 7, wherein the request includes a filter type.

12. The computer-readable storage medium of claim 11, wherein the media frame accessed from the media feed interface includes data associated with the filter type.

13. A system for extracting captured information, the system comprising:
    a processor;
    memory having stored therein computer executable instructions that, when executed by the processor, implement a method for extracting captured information, the method comprising:
        receiving a request to retrieve, from a media feed, data associated with a model of a user;
        accessing the media feed; and
        isolating a media frame from the media feed, wherein the media frame includes the data associated with the model of the user, wherein isolating the media frame from the media feed comprises:
            determining that the media frame includes the data associated with the model of the user; and
            extracting the media frame that includes the data associated with the model of the user.

14. The system of claim 13, wherein isolating the media frame occurs at the request of at least one of the following: an application, an operating system, and a gesture library.

15. The system of claim 14, wherein the method further comprises providing the media frame to at least one of the following: the application, the operating system, and the gesture library.

16. The system of claim 13, wherein the request comprises a time stamp, and wherein isolating the media frame from the media feed further comprises:
- determining the media frame from the media feed that corresponds to the specified time stamp in the request; and
- extracting the media frame that corresponds to the specified time stamp in the request.

17. The system of claim 13, wherein the request comprises a filter type, and wherein isolating the media frame from the media feed further comprises:
- filtering data from the media frame based on the filter type in the request; and
- creating a new media feed, the new media feed including the filtered data from the media frame.

18. The system of claim 13, wherein receiving the media feed comprises:
- accessing at least one of a capture device, a capture file, and a network resource;
- receiving data from at least one of the capture device, the capture file, and the network resource;
- populating one or more buffers with the received data; and
- creating the media feed with the received data in the buffers, wherein the media feed includes one or more media frames for the received data in the buffers.

* * * * *